US011964742B2

(12) United States Patent
Kadota et al.

(10) Patent No.: US 11,964,742 B2
(45) Date of Patent: Apr. 23, 2024

(54) HULL BEHAVIOR CONTROL SYSTEM AND MARINE VESSEL

(71) Applicant: YAMAHA HATSUDOKI KABUSHIKI KAISHA, Iwata (JP)

(72) Inventors: Ritsu Kadota, Shizuoka (JP); Tomoyoshi Koyanagi, Shizuoka (JP); Shuichi Moromi, Shizuoka (JP); Sadao Miyano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 394 days.

(21) Appl. No.: 17/348,868

(22) Filed: Jun. 16, 2021

(65) Prior Publication Data

US 2021/0394877 A1 Dec. 23, 2021

(30) Foreign Application Priority Data

Jun. 17, 2020 (JP) .................. 2020-104817

(51) Int. Cl.
*B63B 79/15* (2020.01)
*B63H 21/21* (2006.01)
(Continued)

(52) U.S. Cl.
CPC ............. *B63B 79/15* (2020.01); *B63H 21/21* (2013.01); *G05D 1/0066* (2013.01); *G05D 13/66* (2013.01);
(Continued)

(58) Field of Classification Search
CPC .. B63B 1/00; B63B 1/24; B63B 79/00; B63B 79/15; B63H 21/00; B63H 21/21;
(Continued)

(56) References Cited

U.S. PATENT DOCUMENTS 6,890,223 B2 * 5/2005 Kanno ................... B63H 21/21
   440/1
7,039,512 B2 * 5/2006 Swinbanks ............. F16F 15/02
   701/21
(Continued)

FOREIGN PATENT DOCUMENTS

EP   3 006 321 A1   4/2016
JP   01-262291 A   10/1989
(Continued)

OTHER PUBLICATIONS

Zipwake, "Operators Manual Dynamic Trim Control System", Retrieved from the Internet http://www.zipwake.com, retrieved on Jun. 3, 2020, 147 pages.
(Continued)

*Primary Examiner* — Lars A Olson
(74) *Attorney, Agent, or Firm* — Keating & Bennett, LLP

(57) ABSTRACT

A hull behavior control system includes a memory and at least one controller coupled to the memory. The at least one controller is configured or programmed to control a propulsion force of the marine vessel using a propeller of the marine vessel, obtain a water surface shape around the marine vessel, estimate movement of a wave based on the water surface shape, and reduce the propulsion force by controlling the propeller when it is determined that an impact force equal to or greater than a threshold value will act on the hull after the hull travels over the wave whose movement has been estimated.

18 Claims, 14 Drawing Sheets

(51) Int. Cl.
*G05D 1/00* (2006.01)
*G05D 13/66* (2006.01)
*G06N 20/00* (2019.01)

(52) U.S. Cl.
CPC ....... *G06N 20/00* (2019.01); *B63H 2021/216* (2013.01)

(58) Field of Classification Search
CPC ...... B63H 20/00; G06N 20/00; G05D 1/0066; G05D 13/66; B60G 17/00; B60G 17/0081; B60G 17/08; F16F 15/02
USPC .......................................................... 440/1
See application file for complete search history.

(56) References Cited

U.S. PATENT DOCUMENTS

2003/0054704 A1 3/2003 Kanno
2004/0024503 A1 2/2004 Swinbanks et al.

FOREIGN PATENT DOCUMENTS

| JP | 3345611 B2 | 11/2002 |
| JP | 2003-097309 A | 4/2003 |
| JP | 2008-044472 A | 2/2008 |
| JP | 2009-214879 A | 9/2009 |
| JP | 2017-058322 A | 3/2017 |
| WO | 2014/192532 A1 | 12/2014 |

OTHER PUBLICATIONS

Takagi et al., "On the Accuracy of the Strip Theory, Used for a Calculation of Ship Motions in Waves", Material for the Annual Spring Meeting, the Society of Naval Architects of Japan, May 1967, pp. 48-61.

* cited by examiner

HULL BEHAVIOR CONTROL SYSTEM AND MARINE VESSEL

CROSS REFERENCE TO RELATED APPLICATIONS

This application claims the benefit of priority to Japanese Patent Application No. 2020-104817 filed on Jun. 17, 2020. The entire contents of this application are hereby incorporated herein by reference.

BACKGROUND OF THE INVENTION

1. Field of the Invention

The present invention relates to hull behavior control systems for controlling hulls in waves and to marine vessels sailing on waves.

2. Description of the Related Art

When a marine vessel sails on waves, behavior of a hull is affected by the waves. In particular, a hull can become unstable by being hit broadside by a wave, which may result in capsizing of the marine vessel. In view of that, a technique to control the traveling direction of a hull in waves so as to prevent the hull from being hit broadside by a wave is known (e.g., see Japanese Laid-open Patent Publication (JP-A) No. 2017-58322).

In the technique disclosed in JP-A No. 2017-58322, a hull is controlled so that the bow or stern of the hull faces the waves. In such a technique, for example, a laser radar mounted on the hull detects waves around a marine vessel, and the detected waves are divided into groups of multiple waves. The direction of the waves is then estimated from the velocity vector of one or more of the groups of waves, and the steering device is controlled so that the bow or stern of the hull faces the waves in accordance with the estimated direction of the waves.

However, in the technique disclosed in JP-A No. 2017-58322, the control of the steering device can result in the marine vessel sailing with its bow facing waves and the hull thus sometimes rides a wave. If the wave height of the wave on which the hull rides is high, the hull after traveling over the wave and falling onto the water is hit by the water with an excessive impact force. Thus, there is still room for improvement in controlling behavior of a hull of a marine vessel from a viewpoint of reducing damage of the hull and a viewpoint of providing comfort to the crew.

SUMMARY OF THE INVENTION

Preferred embodiments of the present invention provide hull behavior control systems and marine vessels that are each able to reduce damage to hulls and improve the comfort of the crew.

According to a preferred embodiment of the present invention, a hull behavior control system for controlling behavior of a hull of a marine vessel including a propeller includes a memory and at least one controller coupled to the memory. The at least one controller is configured or programmed to control a propulsion force of the marine vessel using the propeller, obtain a water surface shape around the marine vessel, estimate movement of a wave based on the water surface shape, and reduce the propulsion force by controlling the propeller when it is determined that an impact force equal to or greater than a threshold value will act on the hull after the hull travels over the wave whose movement has been estimated.

According to another preferred embodiment of the present invention, a hull behavior control system for controlling behavior of a hull of a marine vessel including a propeller includes a memory and at least one controller coupled to the memory. The at least one controller is configured or programmed to control a propulsion force of the marine vessel using the propeller, obtain a water surface shape around the marine vessel, and reduce the propulsion force by controlling the propeller when it is determined that an impact force equal to or greater than a threshold value will act on the hull after the hull travels over a wave around the marine vessel.

According to preferred embodiments of the present invention, when it is determined that an impact force equal to or greater than a threshold value will act on the hull after the hull travels over a wave (e.g., a wave whose movement has been estimated) around the marine vessel, the at least one controller reduces the propulsion force of the marine vessel. This sufficiently lowers the vessel speed to reduce the inertia force resulting in that the bow of the marine vessel does not leave the water. In particular, when the propulsion force is controlled to be reduced at the moment when the bow of the marine vessel travels over the wave, the at least one controller controls an excessive pitch behavior of the bow and prevents the bow from leaving the water. As a result, this avoids the impact force equal to or greater than the threshold value acting on the vessel bottom of the marine vessel due to the marine vessel landing on the water, which reduces damage to the hull and improves the comfort of the crew.

According to another preferred embodiment of the present invention, a hull behavior control system for controlling behavior of a hull of a marine vessel including a propeller includes a memory and at least one controller coupled to the memory. The at least one controller is configured or programmed to control a posture of the hull, obtain a water surface shape around the marine vessel, and estimate movement of a wave based on the water surface shape, and when it is determined that an impact force equal to or greater than a threshold value will act on the hull after the hull travels over the wave whose movement has been estimated, change the posture of the hull so as to reduce the impact force.

According to another preferred embodiment of the present invention, a hull behavior control system for controlling behavior of a hull of a marine vessel includes a memory and at least one controller coupled to the memory. The at least one controller is configured or programmed to control a posture of the hull, obtain a water surface shape around the marine vessel, estimate movement of a wave based on the water surface shape, and when using the water surface shape to make a determination that an impact force equal to or greater than a threshold value will act on the hull after the hull travels over a wave around the marine vessel, change the posture of the hull so as to reduce the impact force.

According to preferred embodiments of the present invention, when it is determined that an impact force equal to or greater than a threshold value will act on the hull after the hull travels over a wave (e.g., a wave whose movement has been estimated) around the marine vessel, the at least one controller changes the posture of the hull so as to reduce the impact force. This results in the bow of the marine vessel not leaving the water. In particular, when the at least one controller changes the posture of the hull so as to reduce the impact force before the bow of the marine vessel travels over the wave, the at least one controller controls an excessive pitch behavior of the bow and prevents the bow from leaving the water. As a result, this avoids the impact force equal to or greater than the threshold value acting on the vessel bottom of the marine vessel due to the marine vessel landing on the water which reduces damage to the hull and improves the comfort of the crew.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
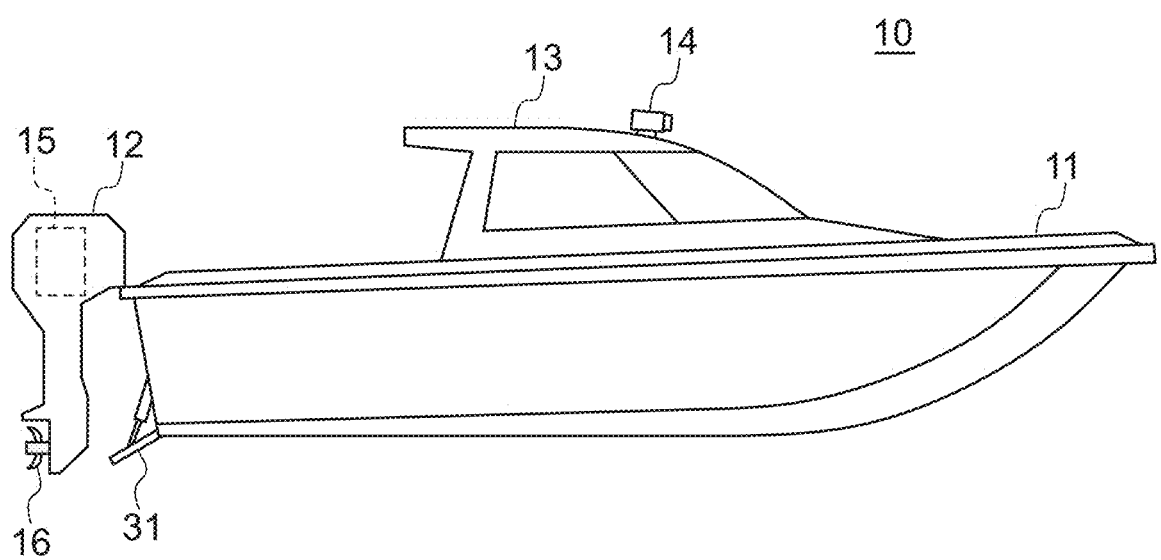
FIG. 1 is a side view of a marine vessel to which a hull behavior control system according to a first preferred embodiment of the present invention is provided.

First, the first preferred embodiment of the present invention is described. FIG. 1 is a side view of a marine vessel to which the hull behavior control system according to the first preferred embodiment of the present invention is provided. A marine vessel 10 is, for example, a planing boat, and includes a hull 11 and an outboard motor 12 mounted on the hull 11, in which the outboard motor 12 defines and functions as a marine propulsion device. The hull 11 is provided with a cabin 13 that also serves as a cockpit, and the roof of the cabin 13 is provided with a stereo camera 14 that captures the condition of a water surface around, in particular, ahead of the marine vessel 10. The outboard motor 12 includes an engine 15 which defines and functions as a drive source, and a screw propeller 16 which defines and functions as a propeller. The outboard motor 12 generates a propulsive force to move the hull 11 by the screw propeller 16 being rotated by a driving force of the engine 15.

The marine vessel 10 further includes a hull posture controller 31. The hull posture controller 31 includes, for example, a plate-shaped trim tab or a flap attached to the stern of the hull 11, and adjusts the posture of the hull 11, in particular, the trim angle of the hull 11, by a lift force that changes according to a vertical position of the hull posture controller 31. The marine vessel 10 further includes an anemometer that measures the direction and wind speed of wind in the vicinity, a gyroscope that measures the posture of the hull 11, and an accelerometer that measures the acceleration and direction of the hull 11.

Figure 2:
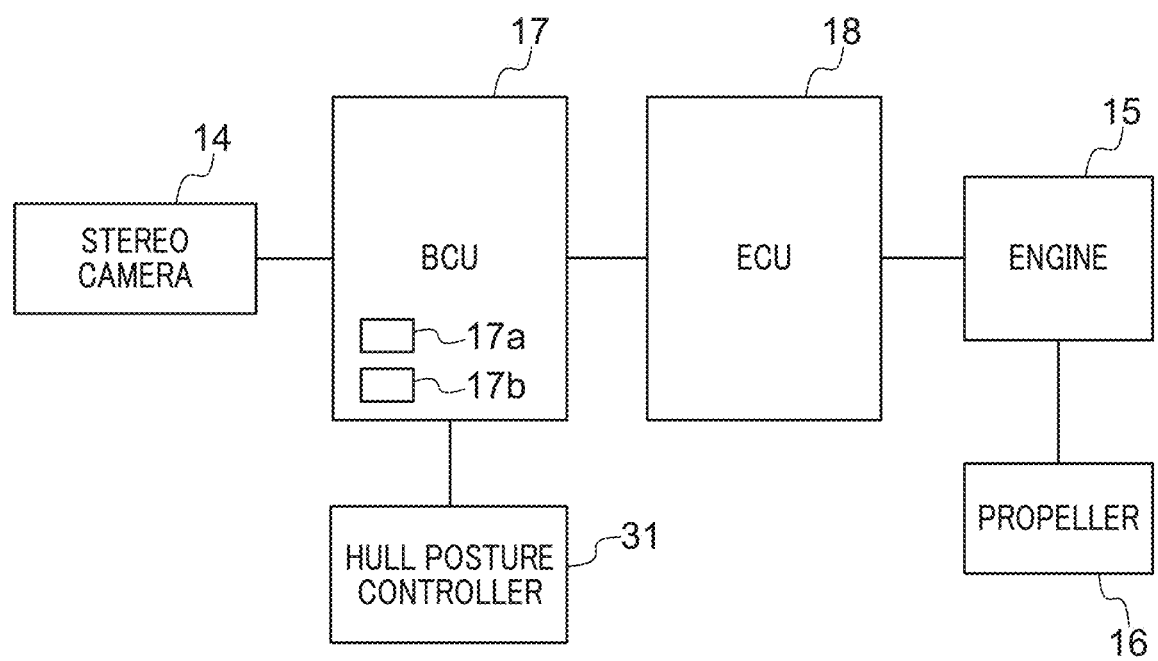
FIG. 2 is a block diagram schematically illustrating a configuration of the hull behavior control system according to the first preferred embodiment of the present invention.

FIG. 2 is a block diagram schematically illustrating the configuration of the hull behavior control system according to the first preferred embodiment of the present invention. The hull behavior control system includes a boat control unit (BCU) 17 to which the stereo camera 14 is connected, and an engine control unit (ECU) 18 that controls the engine 15. The BCU 17 includes a memory 17a and a CPU 17b, and functions as a water surface shape obtainer that obtains a water surface shape around the marine vessel 10 based on information output from a sensor or receiver mounted on the marine vessel 10, and also functions as a controller that controls the propulsion force of the marine vessel 10 and the posture of the hull 11. In the present preferred embodiment, the BCU 17 performs image processing on an image captured by the stereo camera 14 to obtain data of a water surface shape around the marine vessel 10. In the BCU 17, the CPU 17b executes a program stored in the memory 17a thus executing the first hull behavior control process which will be described below. The ECU 18 functions as a controller that controls the engine 15. In the present preferred embodiment, the ECU 18 adjusts the opening of the throttle (not illustrated) based on the control signal transmitted from the BCU 17 to control the rotational speed of the engine 15, and controls the rotation of the screw propeller 16. Thus, the propulsion force of the marine vessel 10 is controlled.

Furthermore, in the BCU 17, the CPU 17b executes a program stored in the memory 17a thus making it possible to execute the second hull behavior control process which will be described below. At this time, the BCU 17 transmits a control signal to the hull posture controller 31 to control the hull posture controller 31.

Figure 3:
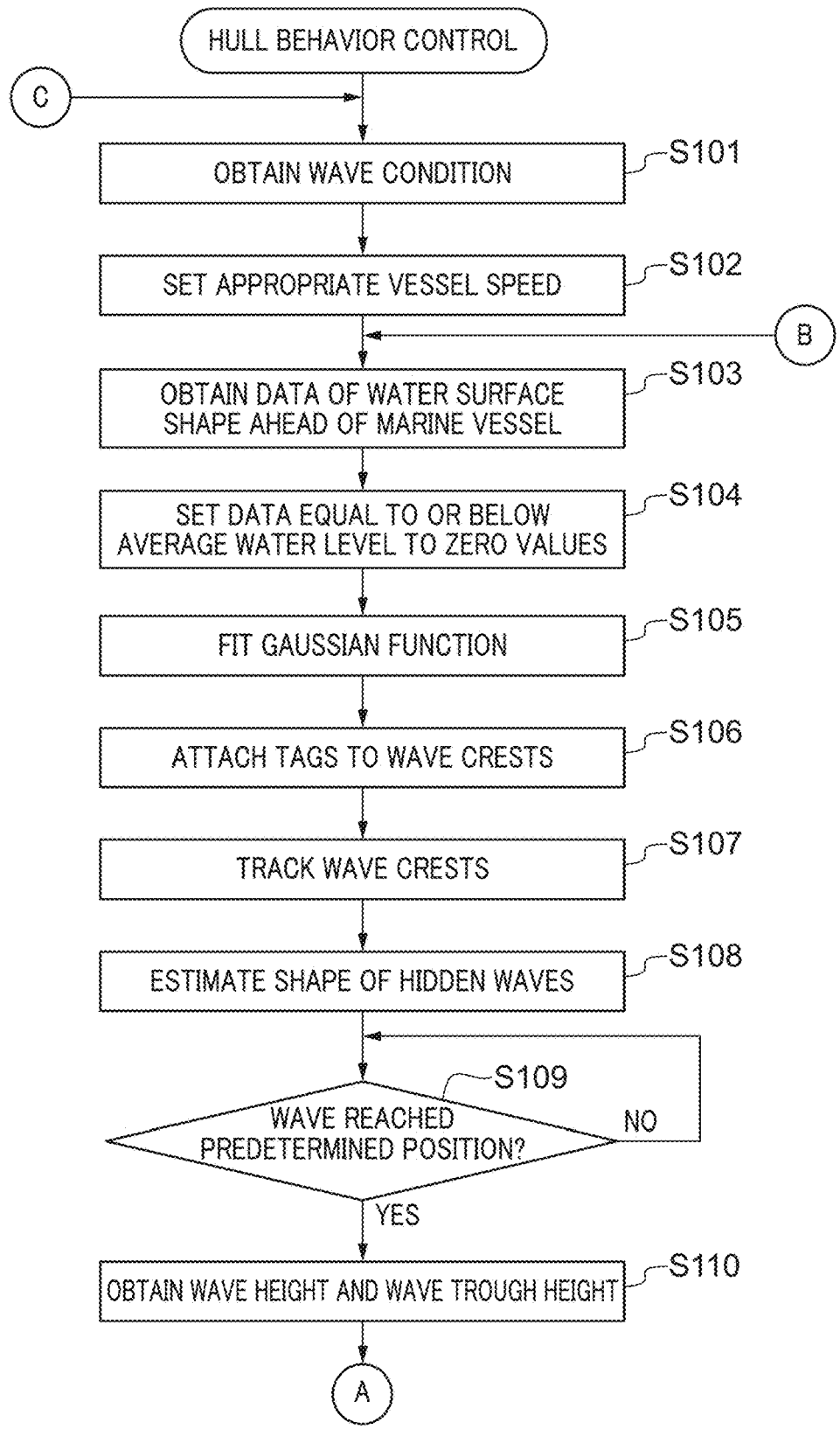
FIG. 3 is a flowchart illustrating a first hull behavior control process performed by a BCU.
Figure 4:
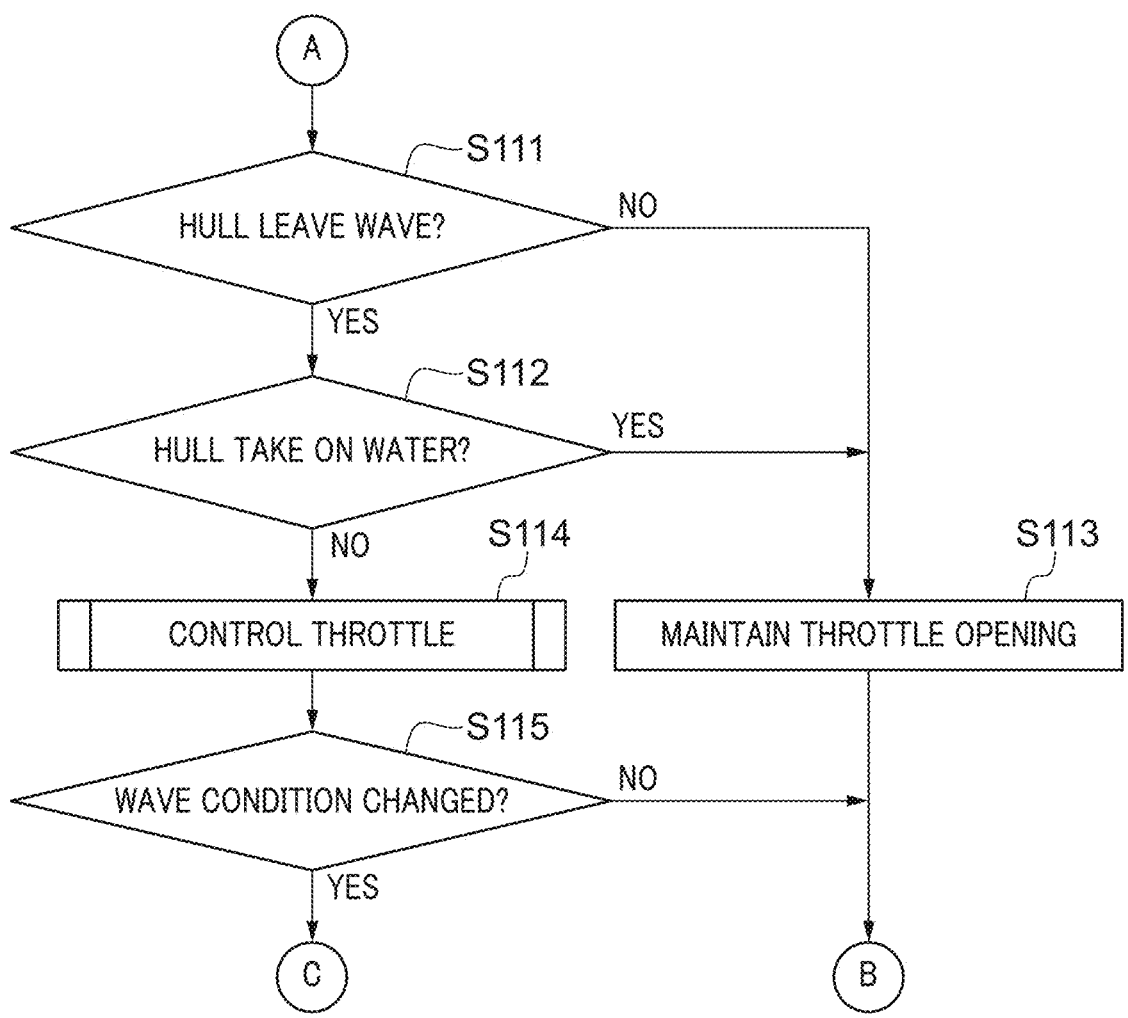
FIG. 4 is a flowchart illustrating the first hull behavior control process performed by the BCU.

FIGS. 3 and 4 are flowcharts illustrating the first hull behavior control process performed by the BCU 17. First, the BCU 17 causes the stereo camera 14 to capture the condition of the water surface around the marine vessel 10, causes the anemometer or the like to measure the direction and wind speed of the wind in the vicinity of the marine vessel 10, causes the gyroscope to measure the posture of the hull 11, causes the accelerometer to measure the acceleration and direction of the hull 11, and obtains the wave condition around the hull 11 from these measurement results (step S101).

Next, the BCU 17 sets an appropriate vessel speed based on the obtained wave condition around the marine vessel (step S102). Instead of the steps S101 and S102, a vessel operator may set an appropriate vessel speed by visually or physically determining the condition of the water surface around the marine vessel 10, the direction and wind speed of the wind in the vicinity of the marine vessel 10, and the posture of the hull 11, and then operating the throttle lever based on these variables.

Figure 5A:
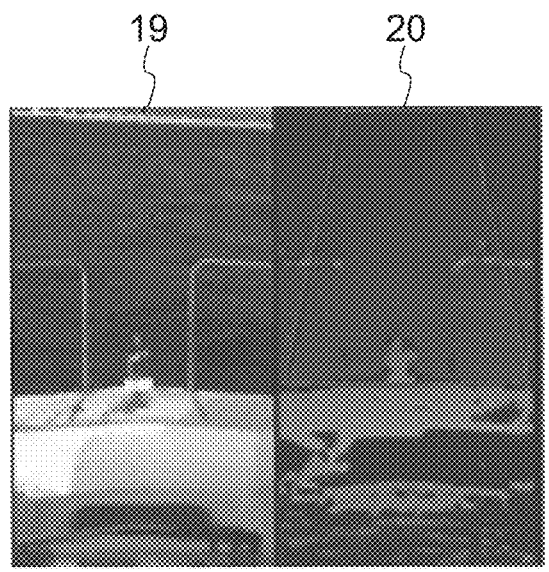
FIGS. 5A to 5C are views for explaining a process of obtaining wave height information from an image captured by a stereo camera.
Figure 5B:
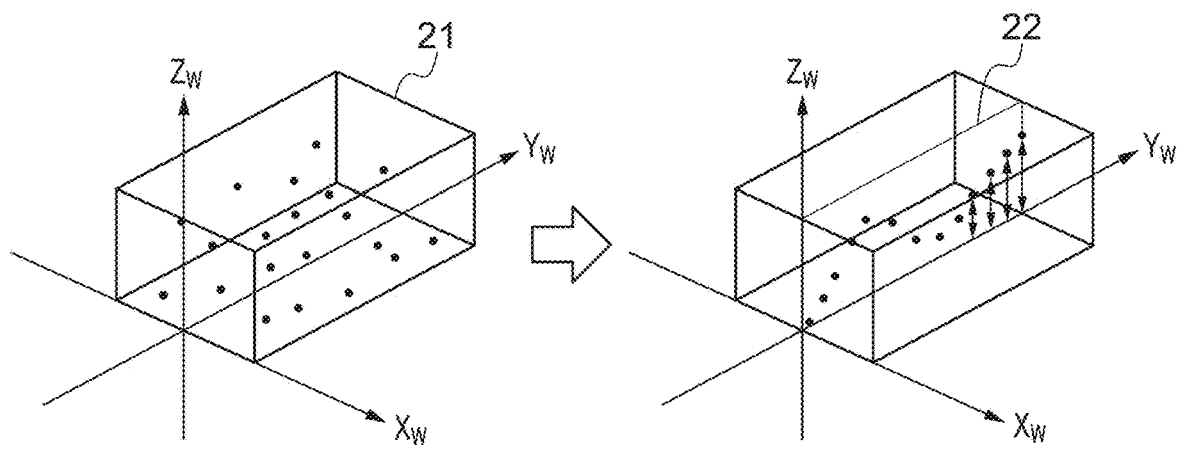
Figure 5C:
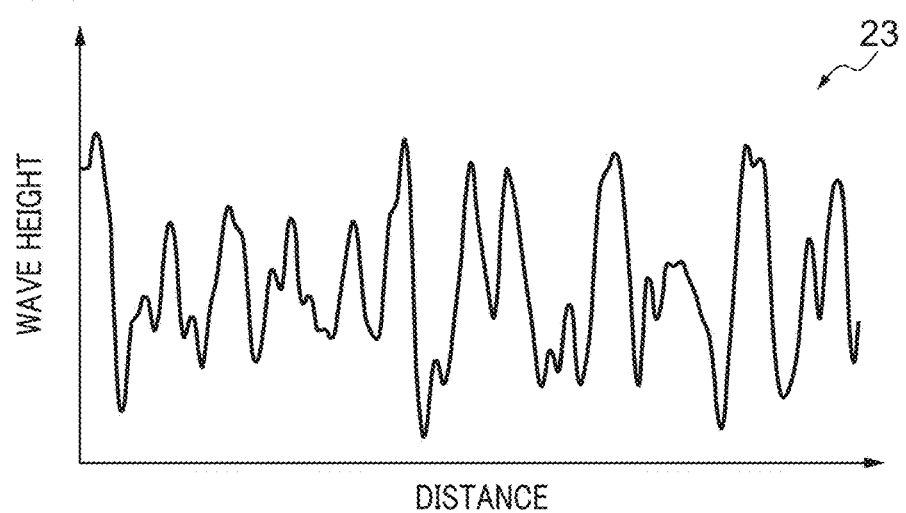

Next, the BCU 17 performs image processing on the image captured by the stereo camera 14 to obtain data of a water surface shape ahead of the marine vessel 10 (step S103). Specifically, the BCU 17 performs image processing on an image 19 (FIG. 5A) of the condition of the water surface ahead of the marine vessel 10 captured by the stereo camera 14, and obtains an image 20 (FIG. 5A) in which edges or other information contents of the image are enhanced. From the image 20, the BCU 17 further obtains three-dimensional data 21 of the water surface shape ahead of the marine vessel 10 (FIG. 5B). In FIG. 5B, Yw indicates the position of the water surface in the traveling direction of the marine vessel 10, and Xw and Zw indicate the positions of the water surface in directions perpendicular to Yw, respectively. Then, the BCU 17 extracts undulation information 22 in the traveling direction (Yw direction in FIG. 5B) of the marine vessel 10 from the three-dimensional data 21, and obtains from the undulation information 22 wave height information 23 as illustrated in FIG. 5C as data of a water surface shape ahead of the marine vessel 10. In FIG. 5C, the horizontal axis indicates the distance from the hull 11.

Figure 6A:
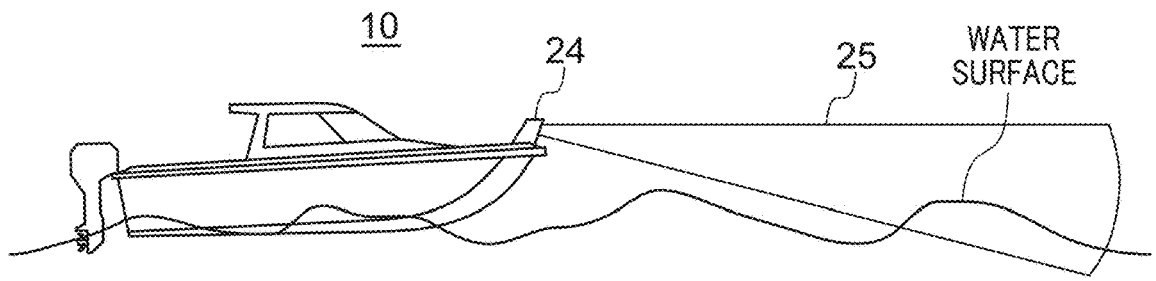
FIGS. 6A to 6C are views for explaining a process of obtaining wave height information by a millimeter wave radar.
Figure 6B:
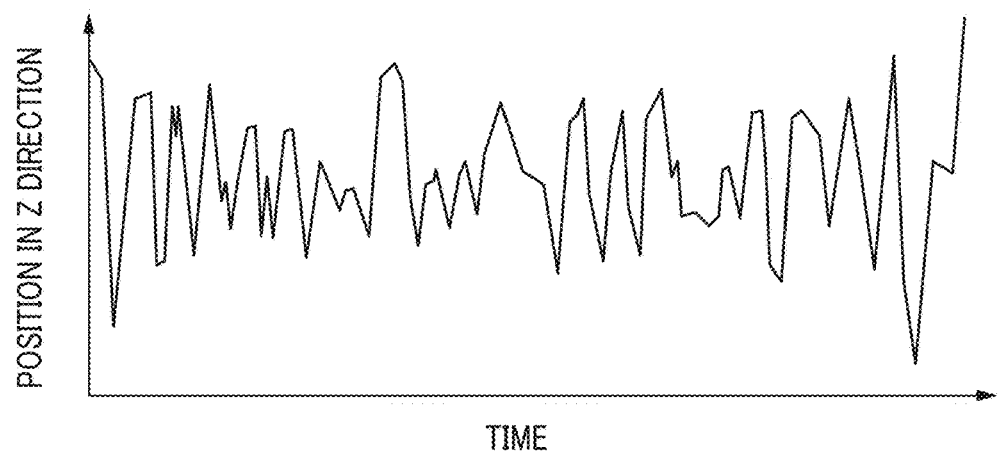

The way to obtain the wave height information 23 is not limited to that using the stereo camera 14. For example, as illustrated in FIG. 6A, the wave height information 23 may be obtained with a millimeter wave radar 24 mounted on the marine vessel 10, e.g., the bow, and the BCU 17 causes the millimeter wave radar 24 to irradiate a millimeter wave 25 toward the water surface ahead of the marine vessel 10, obtain the reflected wave from the water surface, and generate a water surface reflection map. The BCU 17 may obtain the wave height information 23 by using laser imaging detection and ranging (LIDAR) instead of the millimeter wave radar 24 to obtain the reflected light from the water surface ahead of the marine vessel 10 and then generating a water surface reflection map. Alternatively, the BCU 17 may use the gyroscope and accelerometer of the marine vessel 10 to obtain time series data (FIG. 6B) of the position change of the hull 11 in the height direction (Z direction), and estimate the wave height information 23 using a Kalman filter and spectrum decomposition from the time series data.

Figure 6C:
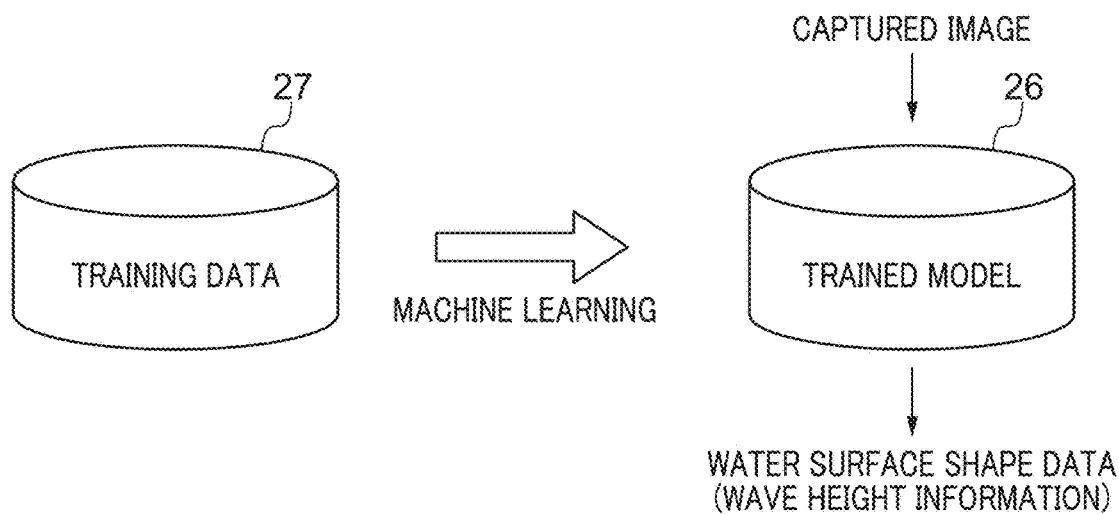

Furthermore, the BCU 17 may input the image 19 of the condition of the water surface ahead of the marine vessel 10 to a trained machine learning model 26 (first machine learning model) configured as, for example, a convolutional neural network, and receive the wave height information 23 output from the trained machine learning model 26 as data of the water surface shape ahead of the marine vessel 10. As illustrated in FIG. 6C, the trained machine learning model 26 is generated by machine learning using training data 27, and is configured so as to output wave height information (data of a water surface shape) in response to input of a captured image of the condition of the water surface. Here, the training data 27 includes a large number of images of the water surface conditions captured by the stereo camera 14 for the training, and these images are associated with corresponding wave height information (data of a water surface shape) obtained from the respective images.

Figure 7A:
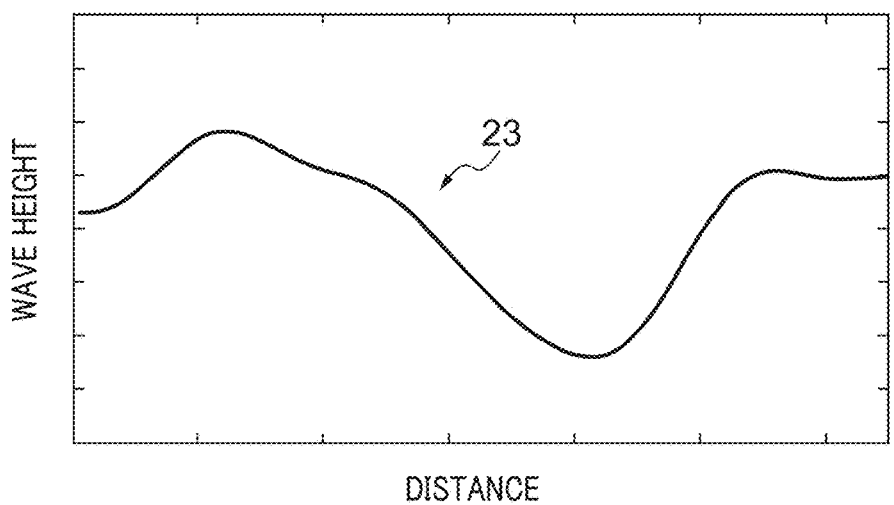
FIGS. 7A to 7C are views for explaining a process of estimating a wave shape from wave height information.
Figure 7B:
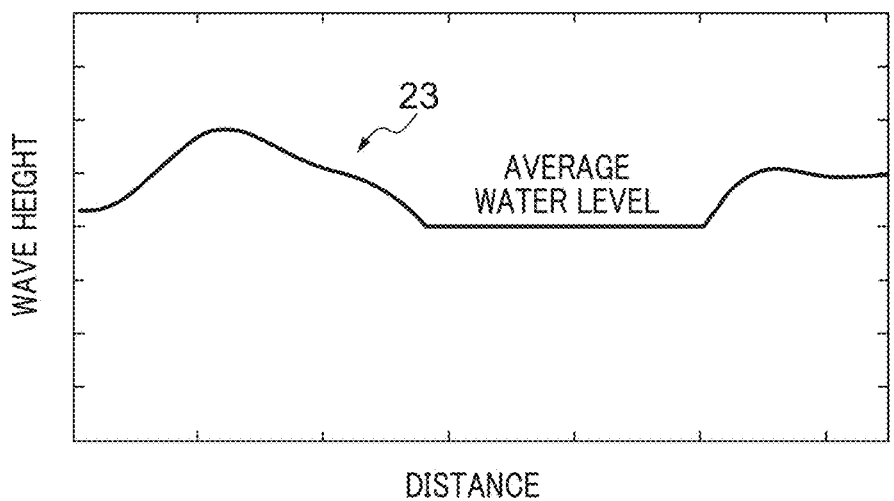
Figure 7C:
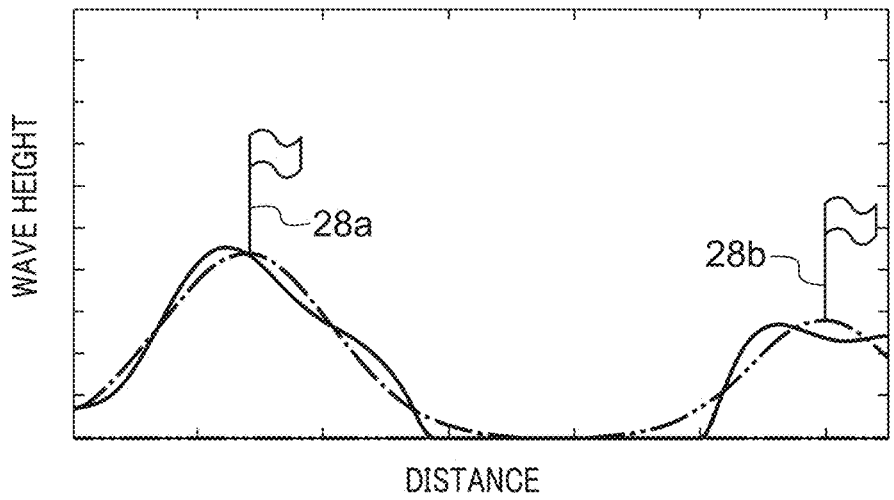

Returning to FIG. 3, in step S104, the BCU 17 sets the data equal to or below the average water level in the wave height information 23 (FIG. 7A) to zero values and deletes information equal to or below the average water level from the wave height information 23. The BCU 17 extracts a wave crest portion or portions in the wave height information 23. For example, in the case illustrated in FIG. 7B, two wave crest portions are extracted. Thereafter, in step S105, based on an assumption that each wave crest portion extracted from the wave height information 23 has a shape of normal distribution, the BCU 17 estimates the shape of each wave by fitting the Gaussian function to each crest portion. Each estimated wave is indicated by a one-dot chain line or a two-dot chain line in FIG. 7C.

Figure 8A:
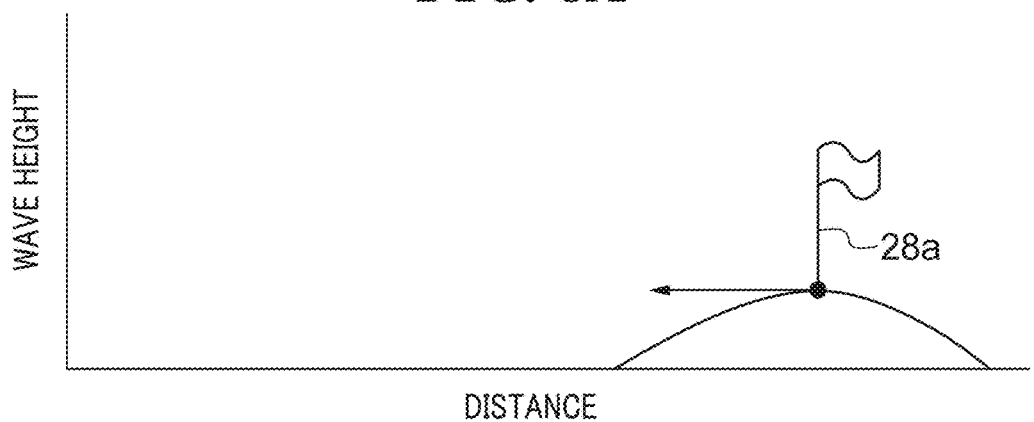
FIGS. 8A to 8C are views illustrating how to track a wave crest.
Figure 8B:
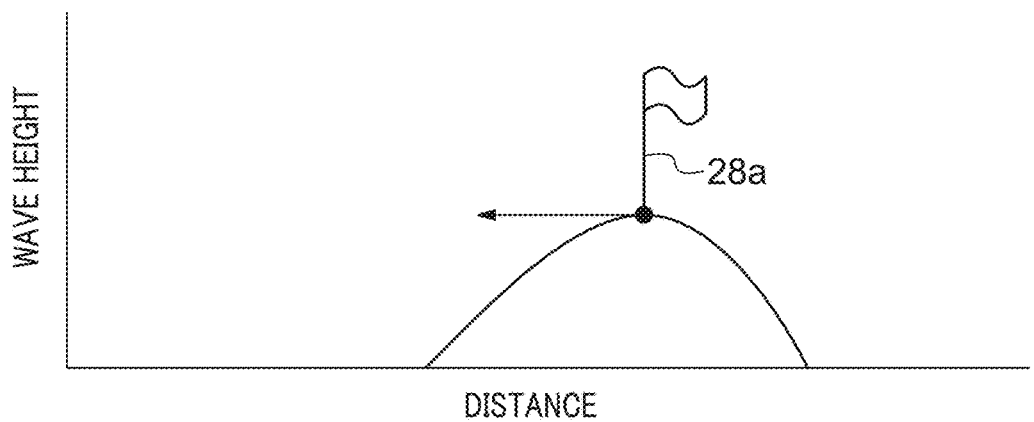
Figure 8C:
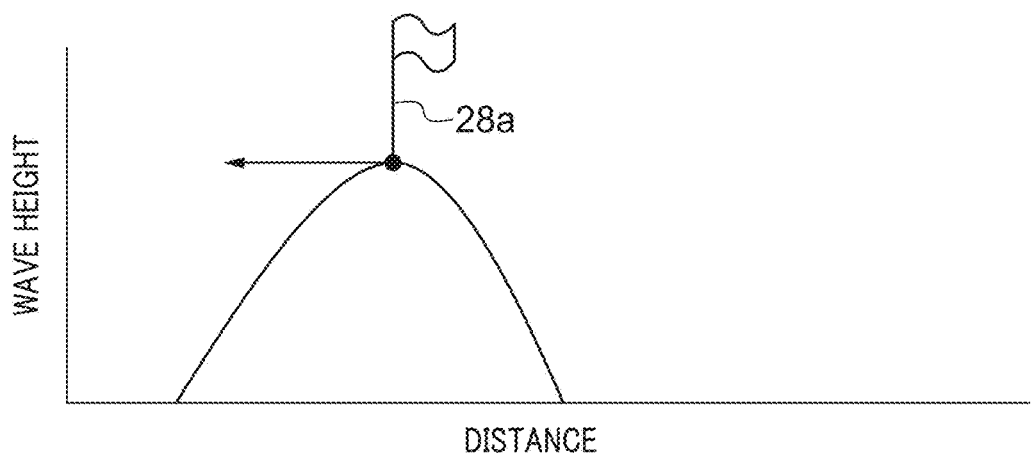

Next, in a case in which the estimated waves are heading toward the marine vessel 10, the BCU 17 extracts the wave crests of the waves, attaches tags 28a and 28b to the respective wave crests (step S106), and tracks the wave crests (step S107). FIGS. 8A to 8C illustrate how to track the wave crest with the tag 28a. Here, the BCU 17 tracks the tag 28a using the Kalman filter and predicts or estimates the deformation and movement of each wave. Specifically, from the position and height of the wave crest to which the tag 28a is attached in step S106, the BCU 17 repeatedly estimates the position and height of the wave crest that changes over time by using a state equation and an observation equation (FIGS. 8A to 8C). At this time, using the state equation and observation equations of the Kalman filter to repeatedly estimate the position and height of each point constituting the wave with the tag 28a, which changes over time, the BCU 17 predicts or estimates also the shape and movement of waves on the water surface that are hidden by the bow of the hull 11 and are not captured by the stereo camera 14 (step S108).

When the shape and movement of waves are predicted or estimated, for example, in rainy weather or at night, the reliability of the image captured by the stereo camera 14 and the reliability of the reflected wave from the water surface obtained by the millimeter wave radar 24 decrease, and as a result, the reliability of the shape and movement of the wave predicted or estimated using the Kalman filter from the wave height information 23 also decreases. In such a case, the BCU 17 may predict or estimate the shape and movement of waves in the vicinity of the hull 11 by statistically analyzing the time series data of the posture change of the hull 11 obtained by the gyroscope or accelerometer of the marine vessel 10.

Next, the BCU 17 determines whether or not the wave with the tag 28a has approached the hull 11 and reached a predetermined position (step S109), and if the wave has not reached the predetermined position, the BCU 17 repeats step S109. If the wave with the tag 28a has reached the predetermined position, the BCU 17 generates a trigger signal and obtains the wave height and the wave trough height (depth of the wave bottom) from the shape of the wave estimated based on the trigger signal (step S110). At this time, it is preferable that the BCU 17 performs curve fitting on points ahead or behind the wave crest to approximate the water surface shape in the vicinity of the wave crest with the tag 28a, and obtains the wave height from the curve. The predetermined position may be, for example, a position separated by a predetermined distance from the center of gravity of the hull 11, and is a position where at least the hull 11 does not ride the wave with the tag 28a.

Figure 9A:
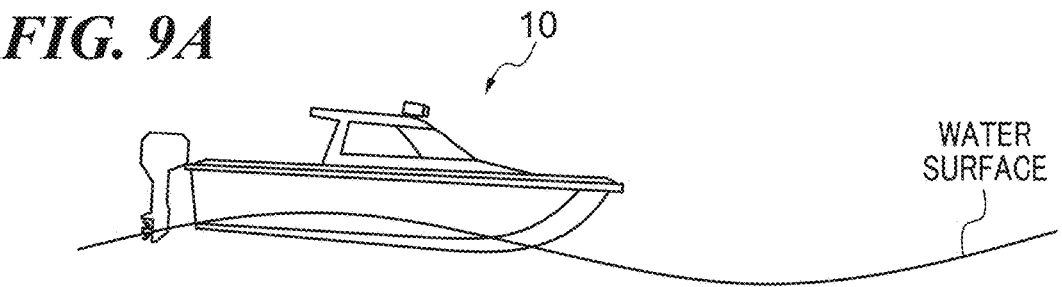
FIGS. 9A to 9D are views for explaining behavior of a marine vessel on waves.
Figure 9B:
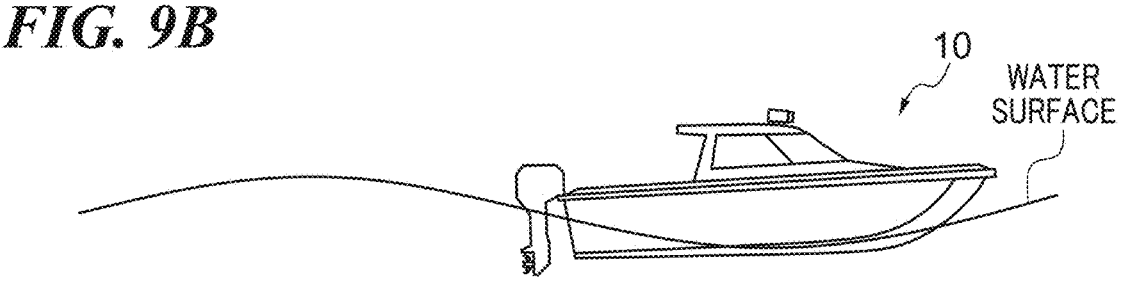
Figure 9C:
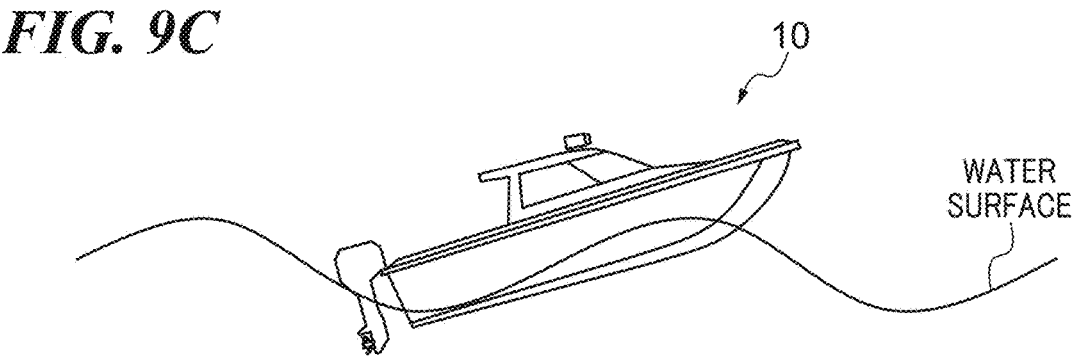
Figure 9D:
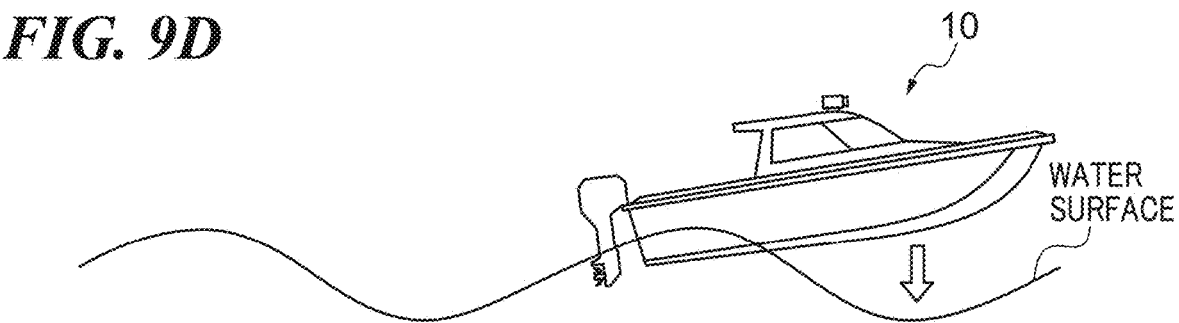

When the marine vessel 10 rides waves under the condition that the difference between the wave crest height and the wave trough height is small and the vessel speed is low, as illustrated in FIG. 9A and FIG. 9B, the marine vessel 10 moves along the surface of the waves, and the bow does not leave the crests of the waves after the marine vessel 10 travels over the respective waves, and thus an excessive impact force does not act on the hull 11. On the other hand, when the marine vessel 10 rides waves under the condition that the difference between the wave crest height and the wave trough height is large and the vessel speed is high, as illustrated in FIG. 9C and FIG. 9D, the hull 11 of the marine vessel 10 that is riding a wave has a large angle of attack, and after the hull travels over the wave, the marine vessel 10 moves according to the inertia force caused by the vessel speed and the bow sometimes leaves the water due to the inertia force. Then, when the hull 11 lands on the water again after the bow leaves the water, the vessel bottom of the hull 11 is hit by the water surface, and an excessive impact force will act on the hull 11.

To solve this problem, in the present preferred embodiment, when it is determined that an impact force equal to or greater than a threshold value will act on the hull 11 after the hull travels over a wave, that is, it is determined that the bow of the marine vessel 10 leaves the crest of the wave, the BCU 17 reduces the vessel speed to prevent the bow from leaving the crest of the wave. Alternatively, by reducing the propulsion force of the marine vessel 10 at the moment when the bow of the marine vessel 10 travels over the wave, the BCU 17 may control the excessive pitch behavior of the bow, and prevent the bow of the marine vessel 10 from leaving the water.

In step S111, the BCU 17 determines whether or not the bow of the marine vessel 10 leaves the crest of the wave after the marine vessel 10 travels over the wave with the tag 28a. For example, the BCU 17 determines whether or not the bow of the marine vessel 10 leaves the crest of the wave by regression analysis with at least the wave height of the wave whose movement has been estimated and the vessel speed of the marine vessel 10 as variables. Specifically, a regression equation is prepared in advance to determine whether or not the bow of the marine vessel 10 leaves the water, and the BCU 17 makes the determination by using the regression equation. The regression equation calculates a numerical value indicating whether or not the marine vessel 10 leaves the water with at least the wave height and the vessel speed as variables. In the present preferred embodiment, using the wave height and the wave trough height obtained in step S110 and the vessel speed obtained from, for example, a GPS type speedometer provided in the marine vessel 10, the BCU 17 determines whether or not the bow of the marine vessel 10 leaves the wave crest based on the regression equation. The BCU 17 may further use the wavelength and the length between perpendiculars of the marine vessel 10 as variables of the regression equation.

In step S111, the BCU 17 may determine whether or not an impact force equal to or greater than an allowable value (threshold value) will act on the vessel bottom at the time of landing on the water after the bow leaves the water, rather than whether or not the bow of the marine vessel 10 leaves the wave crest. In this case, the BCU 17 uses a regression equation to calculate the impact acceleration applied to the vessel bottom with at least the wave height and the vessel speed as variables.

Alternatively, the BCU 17 may obtain the behavior of the marine vessel 10 with the equation of motion (see Takagi Matao, Ganno Masaaki, "On the Accuracy of the Strip Theory, Used for a Calculation of Ship Motions in Waves" (Material for the Annual Spring Meeting, the Society of Naval Architects of Japan, May 1967)) of a hull in waves shown below without using the regression equation, and determine whether or not the bow of the marine vessel 10 leave the wave crest.

$$(a_1 + a_2)\ddot{\zeta} + (b_1 + b_2)\dot{\zeta} + (c_1 + c_2)\zeta + (d_1 + d_2)\ddot{\theta} + (e_1 + e_2)\dot{\theta} + (g_1 + g_2)\theta =$$
$$(F_{c_1} + F_{c_2})\cos\omega_E t - (F_{s_1} + F_{s_2})\sin\omega_E t$$
$$(A_1 + A_2)\ddot{\theta} + (B_1 + B_2)\dot{\theta} + (C_1 + C_2)\theta + (D_1 + D_2)\ddot{\zeta} + (E_1 + E_2)\dot{\zeta} +$$
$$(G_1 + G_2)\zeta = (M_{c_1} + M_{c_2})\cos\omega_E t - (M_{s_1} + M_{s_2})\sin\omega_E t$$

Figure 10:
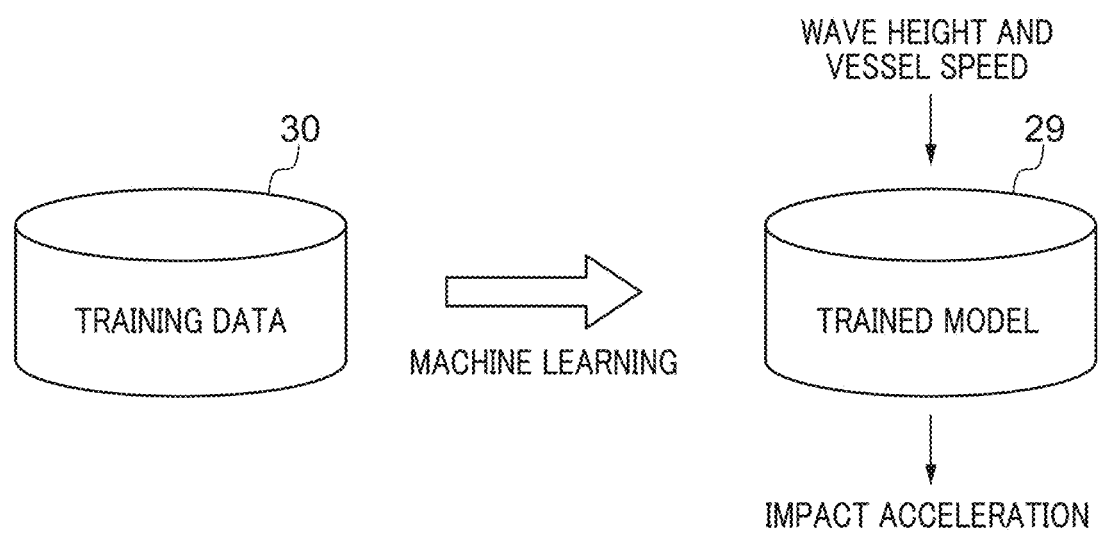
FIG. 10 is a diagram for explaining a trained machine learning model for outputting impact acceleration.

The BCU 17 may input the wave height of the wave on which the marine vessel 10 rides and the vessel speed to a trained machine learning model 29 (second machine learning model) configured as, for example, a convolutional neural network, and receive the impact acceleration applied to the vessel bottom at the time of landing on the water (in other words, after the hull 11 travels over this wave) output, from the trained machine learning model 29, as behavior of the hull 11. As illustrated in FIG. 10, the trained machine learning model 29 is generated by machine learning using training data 30, and outputs impact acceleration applied to the vessel bottom (behavior of the hull 11) in response to input of the wave height and the vessel speed. Here, the training data 30 includes a large number of wave heights of the waves on which the marine vessel 10 rides and the vessel speeds of the marine vessel 10, and the wave heights and the vessel speeds are associated with respective impact accelerations applied to the vessel bottom at the time of landing on the water after the bow leaves the water (behavior of the hull 11). The trained machine learning model 29 may calculate a numerical value indicating whether or not the bow of the marine vessel 10 leaves the water in response to input of the wave height and the vessel speed.

As a result of the determination in step S111, the process proceeds to step S112 if it is determined that after the marine vessel 10 travels over the wave with the tag 28a the bow of the marine vessel 10 leaves the crest of the wave, and on the other hand the process proceeds to step S113 if it is determined that after the marine vessel 10 travels over the wave with the tag 28a the bow of the marine vessel 10 does not leave the crest of the wave. In step S113, the BCU 17 maintains the throttle opening and does not reduce the vessel speed. At this time, the bow of the marine vessel 10 does not leave the crest of the wave on which the marine vessel 10 rides. Thereafter, the process returns to step S103.

Figure 11A:
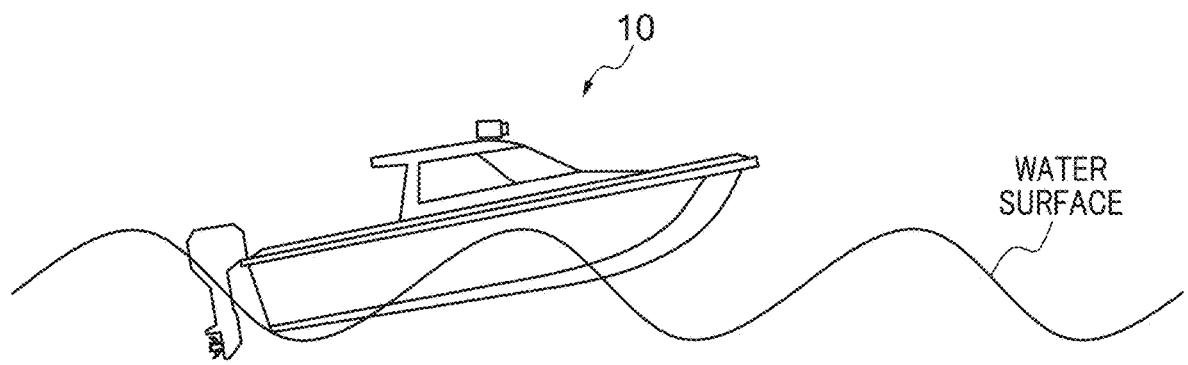
FIGS. 11A and 11B are views for explaining how the bow of a marine vessel on waves takes on water.
Figure 11B:
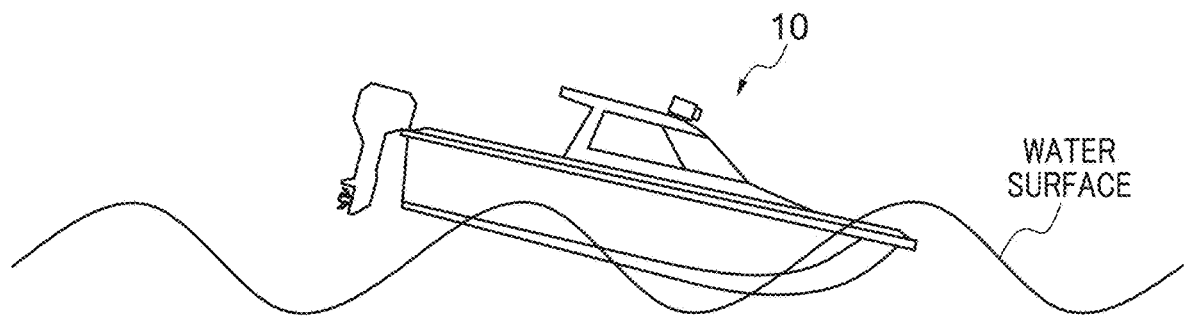

When the marine vessel 10 rides a wave under the condition that the wave and another wave on which the marine vessel 10 will ride next are close, the marine vessel 10 may encounter the following situation. That is, if the marine vessel 10 riding the preceding wave moves along the water surface with the bow of the marine vessel 10 not leaving the water, as illustrated in FIGS. 11A and 11B, the bow of the marine vessel 10 sometimes travels into the following wave on which the marine vessel 10 will ride next and the bow takes on water.

In view of this situation, in the present preferred embodiment, even if the BCU 17 determines that an impact force equal to or greater than the threshold value will act on the hull 11 after the hull travels over a certain wave, the BCU 17 does not reduce the propulsion force of the marine vessel 10 when it is determined that a reduction of the propulsion force results in the bow of the marine vessel 10 going into the wave on which the marine vessel 10 will ride next to the certain wave. This makes the bow of the marine vessel 10 leave the crest of the certain wave on which the marine vessel 10 has ridden.

In the case in which the BCU 17 determines in step S111 that the bow of the marine vessel 10 leaves the crest of the wave, the BCU 17 further determines in step S112 whether or not reducing the propulsion force so as to prevent the bow of the marine vessel from leaving the wave crest results in the marine vessel taking on water from the wave on which the marine vessel 10 will ride next. Specifically, the BCU 17 calculates the distance from the wave on which the marine vessel 10 rides (wave with the tag 28a) to the wave on which the marine vessel 10 will ride next (wave with the tag 28b), and if the distance is equal to or less than a predetermined value, for example, the length between the perpendiculars of the marine vessel 10, the BCU 17 determines that the bow of the marine vessel 10 takes on water, and the process proceeds to step S113. In step S113, the BCU 17 maintains the throttle opening, does not reduce the rotational speed of the screw propeller 16, and does not decrease the vessel speed. Therefore, the bow of the marine vessel 10 leaves the crest of the wave on which the marine vessel 10 rides, and the marine vessel 10 does not move along the water surface. As a result, the bow of the marine vessel 10 does not go into the wave on which the marine vessel 10 will ride next, and the bow of the marine vessel 10 does not take on water. Thereafter, the process returns to step S103.

On the other hand, if the BCU 17 determines in step S112 that the bow of the marine vessel 10 does not take on water, the process proceeds to step S114, where the BCU 17 controls the throttle to reduce the vessel speed.

Figure 12:
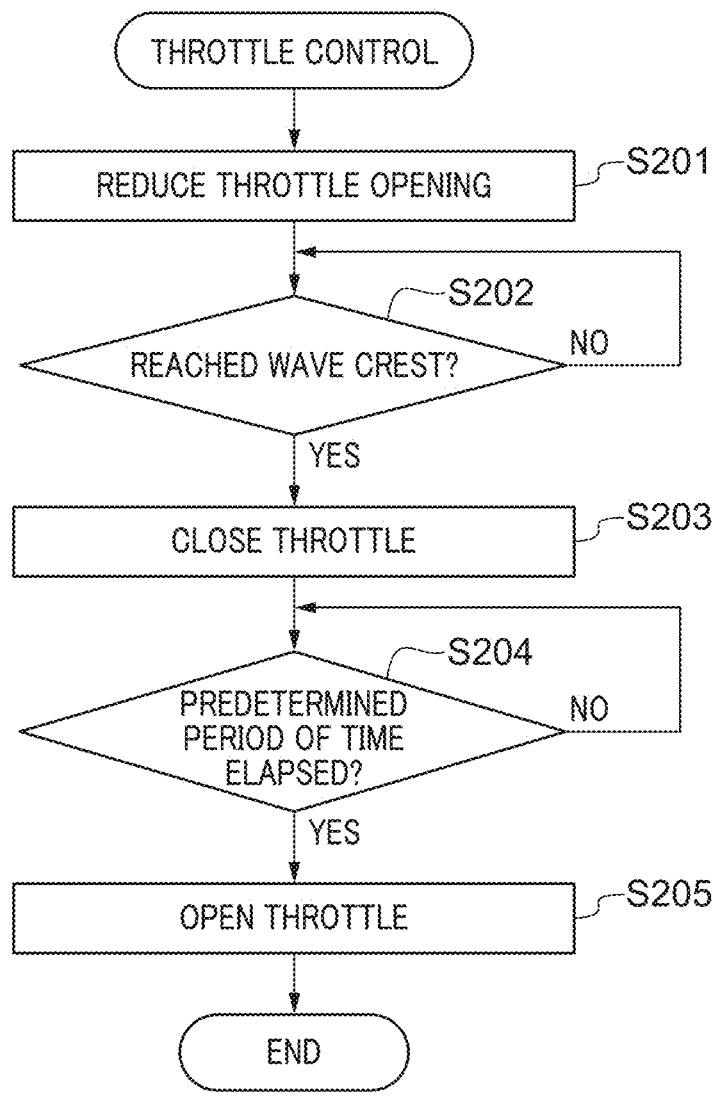
FIG. 12 is a flowchart illustrating a throttle control process in step S114.

FIG. 12 is a flowchart illustrating the throttle control process in step S114. First, when the marine vessel 10 travels up the slope of the wave with the tag 28a toward the wave crest, the BCU 17 transmits, to the ECU 18, a control signal to reduce the throttle opening by a predetermined amount, and the ECU 18 having received the control signal reduces the throttle opening by the predetermined amount (step S201). This decreases the rotational speed of the screw propeller 16 and the vessel speed. At this time, the BCU 17 may change the amount of the throttle opening, by using the ECU 18, in accordance with the magnitude of the impact acceleration expected to be applied to the vessel bottom when the bow leaves the wave crest.

The BCU 17 then determines whether or not the hull 11 has reached the crest of the wave with the tag 28a (step S202). If the hull 11 has not reached the wave crest, the BCU 17 returns the process to step S202, and if the hull 11 has reached the wave crest, the BCU 17 transmits to the ECU 18 a control signal to close the throttle, and the ECU 18 having received the control signal closes the throttle (step S203). At this time, the vessel speed further decreases and the inertia force becomes smaller. Therefore, even if the hull 11 has a large angle of attack, the bow of the marine vessel 10 lowers and the bow does not leave the wave crest. That is, the BCU 17 controls an excessive pitch behavior of the bow of the marine vessel 10 by reducing the propulsion force of the marine vessel 10 at the moment when the bow travels over the wave, and prevents the bow of the marine vessel 10 from leaving the water.

Next, the BCU 17 determines whether or not a predetermined period of time has elapsed (step S204). If the predetermined period of time has not elapsed, the process returns to step S204, and if the predetermined period of time has elapsed, the BCU 17 transmits to the ECU 18 a control signal to open the throttle, and the ECU 18 having received the control signal opens the throttle up to the throttle opening that it was in and before step S114 (step S205). Thereafter, the process proceeds to step S115. The predetermined period of time in step S204 corresponds to, for example, the period of time from when the bow of the hull 11 reaches the wave crest until when the stern of the hull 11 passes the wave crest.

Returning to FIG. 4, in step S115, as in step S101, the BCU 17 obtains the wave condition around the hull 11, and determines whether or not the wave condition around the hull 11 obtained in step S101 has changed. The process returns to step S101 if it is determined that the wave condition around the hull 11 has changed, and the process returns to step S103 if it is determined that the wave condition around the hull 11 has not changed.

Steps S107 to S115 of the first hull behavior control process described above are executed not only for the wave with the tag 28a but also for the wave with the tag 28b and subsequent waves.

According to the present preferred embodiment, when it is determined that the bow of the marine vessel 10 leaves the crest of the wave with the tag 28a of the waves around the marine vessel 10 after the marine vessel 10 travels over the wave (in other words, it is determined that an impact force equal to or greater than the threshold value will act on the hull 11), the throttle opening is reduced and the throttle is eventually closed. Therefore, when the marine vessel 10 reaches the wave crest, the vessel speed is sufficiently reduced, the inertia force becomes sufficiently small, and the bow of the marine vessel 10 does not leave the wave crest. This results in the impact force due to landing of the marine vessel 10 on the water does not act on the vessel bottom of the marine vessel 10, which reduces damage to the hull 11 and provides comfort to the crew.

In the present preferred embodiment, it is determined whether or not the marine vessel 10 leaves the crest of each wave and the throttle opening is reduced only when necessary, and thus the period of time for the throttle opening to be reduced does not become unnecessarily long. This shortens the period of time in which the vessel speed is reduced and avoids an unnecessarily long period of time for the marine vessel to reach its destination.

Next, the second preferred embodiment of the present invention will be described. The second preferred embodiment is basically the same as the first preferred embodiment described above in configuration and operations, and is different from the first preferred embodiment only in that if it is determined that an impact force equal to or greater than the threshold value will act on the hull 11 after the hull travels over a wave around the marine vessel 10 (e.g., a wave whose movement has been estimated), the posture of the hull 11 is controlled to prevent the bow from leaving the crest of the wave. Therefore, description is omitted regarding the redundant configuration and operations, and the different configuration and operations will be described below.

In the case in which the difference between the wave crest height and the wave trough height is large, the marine vessel 10 whose shape is designed inappropriately in terms of going into a wave may encounter the following situation. That is, the hull 11 riding a wave is excessively affected by a force of the wave depending on the posture of the hull 11. This causes the excessive pitch behavior of the bow and the bow sometimes leaves the water (FIG. 9C and FIG. 9D). When the hull 11 lands on the water again after the bow leaves the water, the vessel bottom of the hull 11 is hit by the water surface, and an excessive impact force will act on the hull 11.

To solve this problem, in the present preferred embodiment, when it is determined that the bow of the marine vessel 10 leaves the crest of a wave and an excessive impact force will act on the hull 11, the BCU 17 controls the posture of the hull 11 in advance before the bow of the marine vessel 10 travels over the wave to control the excessive pitch behavior of the bow and prevent the bow of the marine vessel 10 from leaving the water. That is, the BCU 17 changes the posture of the hull 11 so as to reduce the impact force acting on the hull 11.

Figure 13:
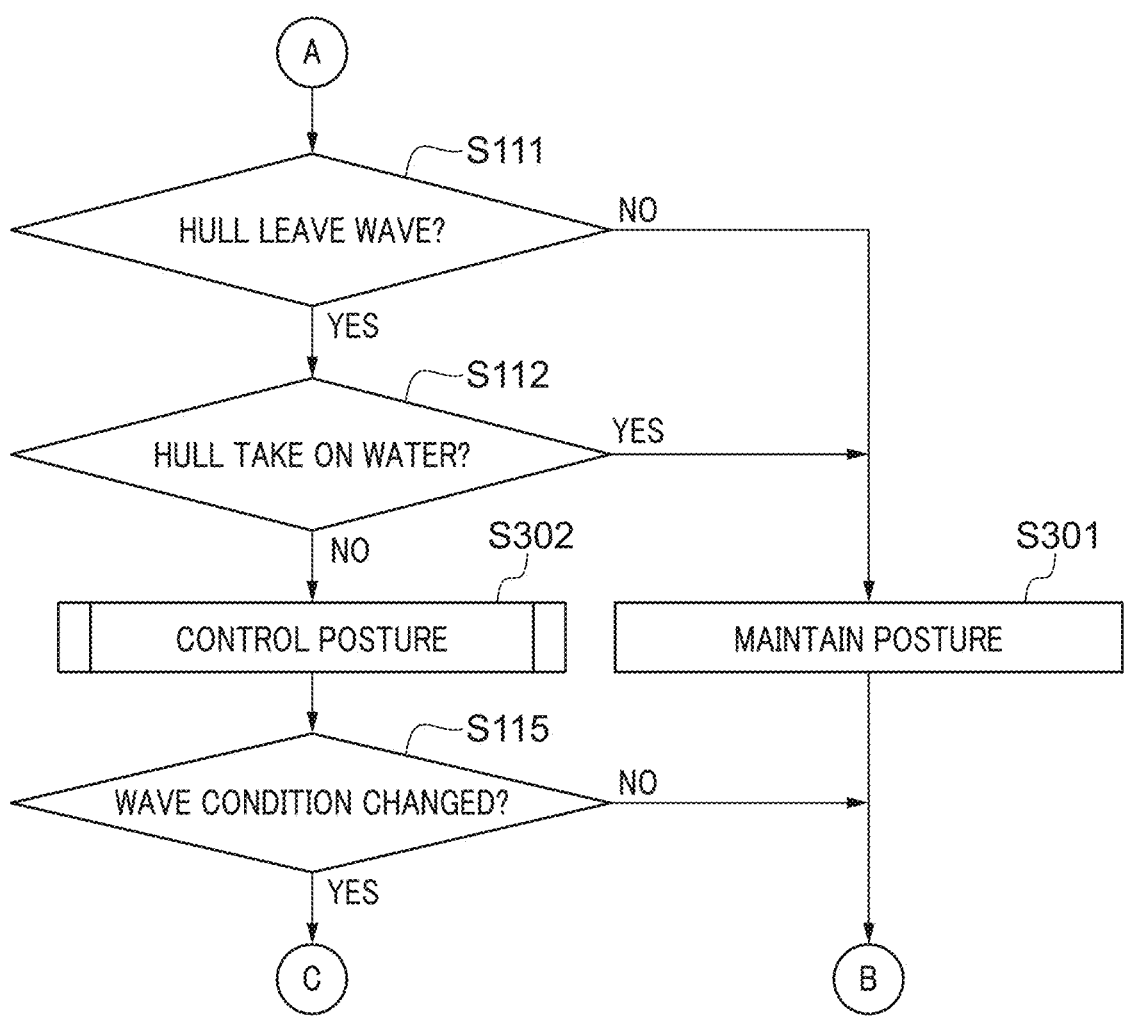
FIG. 13 is a flowchart illustrating a second hull behavior control process performed by the BCU.

FIG. 13 is a flowchart illustrating the second hull behavior control process performed by the BCU 17 in the hull behavior control system according to the second preferred embodiment of the present invention. In this process, instead of steps S113 and S114 in FIGS. 3 and 4, steps S301 and S302 are executed.

In step S301, the BCU 17 does not change the angle of attack of the hull posture controller 31, and maintains and does not change the posture of the hull 11. At this time, the bow of the marine vessel 10 does not leave the crest of the wave on which the marine vessel 10 rides. Thereafter, the process returns to step S103.

In step S112, the BCU 17 makes the following determination under the condition that it is determined in step S111 that the bow of the marine vessel 10 leaves the crest of the wave. That is, the BCU 17 further determines in step S112 whether or not changing the posture of the hull 11 by the hull posture controller 31 so as to prevent the bow of the marine vessel 10 from leaving the water results in the bow taking on water coming from the wave on which the marine vessel 10 will ride next. Then, if it is determined that the bow of the marine vessel 10 takes on water, the process proceeds to step S301.

At this time, in step S301, the posture of the hull 11 is maintained. Therefore, the bow of the marine vessel 10 leaves the crest of the wave on which the marine vessel 10 rides, and the marine vessel 10 does not move along the water surface. As a result, the bow of the marine vessel 10 does not go into the wave on which the marine vessel 10 will ride next, and the bow of the marine vessel 10 does not take on water. Thereafter, the process returns to step S103.

On the other hand, if it is determined in step S112 that the bow of the marine vessel 10 does not take on water, the process proceeds to step S302, in which the BCU 17 appropriately changes the posture of the hull 11 by the hull posture controller 31.

Figure 14:
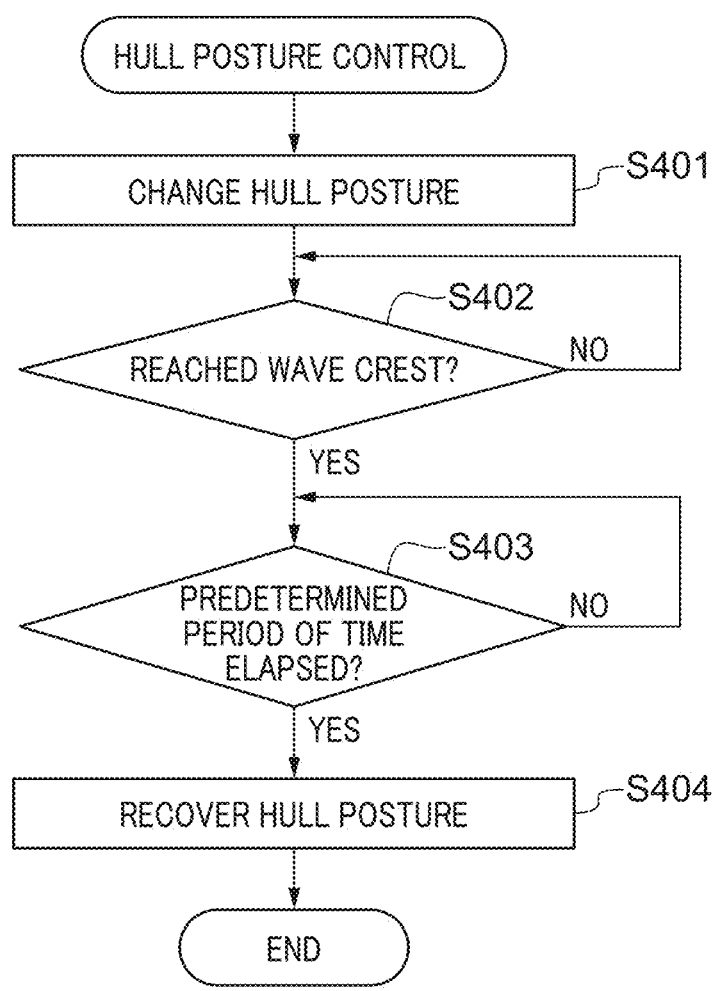
FIG. 14 is a flowchart illustrating a posture control process in step S302.

FIG. 14 is a flowchart illustrating the posture control process in step S302. First, when the marine vessel 10 travels up the slope of the wave with the tag 28a toward the wave crest, the BCU 17 appropriately changes the posture of the hull 11 in advance by controlling the angle of attack of the hull posture controller 31. For example, the BCU 17 changes the trim angle of the hull 11 and lowers the bow to change the posture of the hull 11 so as to be less susceptible to the force of the wave (step S401). Thus, the bow does not cause an excessive pitch behavior even if the force of the wave will act on the hull 11 traveling over the crest of the wave, and thus the bow of the marine vessel 10 does not leave the wave crest.

The BCU 17 then determines whether or not the hull 11 has reached the crest of the wave with the tag 28a (step S402). The process returns to step S402 if the hull 11 has not reached the wave crest, and the process proceeds to step S403 if the hull 11 has reached the wave crest.

Next, the BCU 17 determines whether or not a predetermined period of time has elapsed since the hull 11 reached the wave crest (step S403). If the predetermined period of time has not elapsed, the process returns to step S403, and if the predetermined period of time has elapsed, the BCU 17 recovers the posture of the hull 11 by controlling the angle of attack of the hull posture controller 31. For example, the BCU 17 changes the trim angle of the hull 11 so as to raise the bow (step S404) to prevent the bow from going into the wave on which the marine vessel 10 will ride next.

Thereafter, the process proceeds to step S115. The predetermined period of time in step S403 may be the same as the predetermined period of time in step S204 or may be different from the predetermined period of time in step S204.

According to the present preferred embodiment, when it is determined that the bow of the marine vessel 10 leaves the crest of the wave with the tag 28a of the waves around the marine vessel 10 after the marine vessel 10 travels over the wave (in other words, it is determined that an impact force equal to or greater than the threshold value will act on the hull 11), the posture of the hull 11 is appropriately changed in advance. Therefore, when the marine vessel 10 reaches the wave crest, the posture of the hull 11 changes to a posture less susceptible to the force of the wave, the bow does not cause an excessive pitch behavior, and the bow of the marine vessel 10 does not leave the wave crest. This results in the impact force due to landing of the marine vessel 10 on the water does not act on the vessel bottom of the marine vessel 10, which reduces damage to the hull 11 and provides comfort to the crew.

Also in the second preferred embodiment, as in the first preferred embodiment, the BCU 17 may determine in step S111 whether or not an impact force equal to or greater than an allowable value (threshold value) will act on to the vessel bottom at the time of landing on the water after the bow leaves the water, rather than whether or not the bow of the marine vessel 10 leaves the wave crest.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

For example, in each of the preferred embodiments described above, the BCU 17 may use a Kalman filter to track wave crests and further estimate the shape and movement of waves, but the BCU 17 may use a particle filter instead of the Kalman filter to track wave crests and estimate the shape and movement of waves.

In each of the preferred embodiments described above, the marine vessel 10 includes the outboard motor 12, but the outboard motor 12 may be replaced with an inboard/outboard motor (stern drive or inboard motor/outboard drive) or an inboard motor. Furthermore, the marine vessel 10 may include a water jet, instead of the screw propeller 16, as a propeller of the marine vessel 10. As the hull posture controller 31, an interceptor ("Zipwake", URL: http://www.zipwake.com/) may be used rather than a trim tab or flap, and alternatively, a trim tab, flap, or interceptor provided on not the hull 11 but the main body of the outboard motor 12 may be used.

The control of propulsion force according to the first preferred embodiment and the control of posture of the hull 11 according to the second preferred embodiment may be executed simultaneously, thus making it possible to more reliably prevent the bow of the marine vessel 10 from leaving the wave crest.

What is claimed is:

1. A hull behavior control system for controlling behavior of a hull of a marine vessel including a propeller, the hull behavior control system comprising:
a memory; and
at least one controller coupled to the memory and configured or programmed to:
control a propulsion force of the marine vessel using the propeller;
obtain a water surface shape around the marine vessel;
estimate movement of a wave based on the water surface shape; and
reduce the propulsion force by controlling the propeller when a determination is made that an impact force equal to or greater than a threshold value will act on the hull after the hull travels over the wave whose movement has been estimated; wherein the at least one controller is configured or programmed to not reduce the propulsion force when it is determined that a reduction of the propulsion force results in the marine vessel going into a wave next to the wave whose movement has been estimated, even when the determination is made that the impact force equal to or greater than the threshold value will act on the hull after the hull travels over the wave whose movement has been estimated.

2. The hull behavior control system according to claim 1, wherein the at least one controller is configured or programmed to make the determination when the hull is determined to leave the wave whose movement has been estimated.

3. The hull behavior control system according to claim 1, wherein the at least one controller is configured or programmed to:
control rotation of the propeller; and
reduce a rotational speed of the propeller when the impact force equal to or greater than the threshold value will act on the hull.

4. The hull behavior control system according to claim 1, wherein the at least one controller is configured or programmed to:
obtain water surface undulation information in a traveling direction of the marine vessel based on the water surface shape;
extract a wave from the water surface undulation information; and
estimate movement of the extracted wave.

5. The hull behavior control system according to claim 4, wherein the at least one controller is configured or programmed to:
obtain the water surface undulation information only in the traveling direction of the marine vessel based on the water surface shape;
extract the wave from the water surface undulation information; and
estimate movement of the extracted wave.

6. The hull behavior control system according to claim 4, wherein the at least one controller is configured or programmed to:
delete information equal to or below an average water level from the water surface undulation information; and
extract the wave by fitting a Gaussian function to the water surface undulation information from which the information equal to or below the average water level has been deleted.

7. The hull behavior control system according to claim 4, wherein the at least one controller is configured or programmed to estimate the movement of the extracted wave by tracking a crest of the wave.

8. The hull behavior control system according to claim 1, wherein the at least one controller is configured or programmed to use a Kalman filter to estimate movement of a wave from a water surface shape not obtained by the at least one controller because the wave is hidden by the hull.

9. The hull behavior control system according to claim 1, wherein
the at least one controller is configured or programmed to:
input a water surface image obtained by the at least one controller into a first machine learning model that has been trained; and
estimate the movement of the wave based on a water surface shape output from the first machine learning model; and
the first machine learning model is generated by machine learning using training data including water surface images associated with respective water surface shapes.

10. The hull behavior control system according to claim 1, wherein the at least one controller is configured or programmed to determine whether or not the impact force equal to or greater than the threshold value will act on the hull after the hull travels over the wave whose movement has been estimated using regression analysis with at least a wave height of the wave and a vessel speed of the marine vessel as variables.

11. The hull behavior control system according to claim 1, wherein the at least one controller is configured or programmed to determine whether or not the impact force equal to or greater than the threshold value will act on the hull after the hull travels over the wave whose movement has been estimated using an equation of motion of the hull in waves based on at least a wave height of the wave whose movement has been estimated and a vessel speed of the marine vessel.

12. The hull behavior control system according to claim 1, wherein
the at least one controller is configured or programmed to:
input, into a second machine learning model that has been trained, at least a wave height of the wave whose movement has been estimated and a vessel speed of the marine vessel; and
determine whether or not the impact force equal to or greater than the threshold value will act on the hull after the hull travels over the wave whose movement has been estimated using an output of the second trained machine learning model; and
the second machine learning model is generated by machine learning using training data including at least wave heights of the wave whose movement has been estimated and vessel speeds of the marine vessel, and the wave heights and the vessel speeds are associated with respective behaviors of the hull.

13. The hull behavior control system according to claim 1, wherein, before determining whether or not the impact force equal to or greater than the threshold value will act on the hull after the hull travels over the wave whose movement has been estimated, the at least one controller is configured or programmed to:
obtain a wave condition around the marine vessel; and
set a vessel speed based on the wave condition around the marine vessel.

14. A marine vessel comprising:
a hull;
a propeller; and
the hull behavior control system according to claim 1.

15. A hull behavior control system for controlling behavior of a hull of a marine vessel, the hull behavior control system comprising:
a memory; and
at least one controller coupled to the memory and configured or programmed to:
control a posture of the hull;
obtain a water surface shape around the marine vessel;
estimate movement of a wave based on the obtained water surface shape; and
when it is determined that an impact force equal to or greater than a threshold value will act on the hull after the hull travels over the wave whose movement has been estimated, change the posture of the hull so as to reduce the impact force; wherein the at least one controller is configured or programmed to not change the posture of the hull when it is determined that a change of the posture of the hull results in the marine vessel going into a wave next to the wave whose movement has been estimated, even when it is determined that the impact force equal to or greater than the threshold value will act on the hull after the hull travels over the wave whose movement has been estimated.

16. The hull behavior control system according to claim 15, wherein the at least one controller is configured or programmed to make the determination when the hull is determined to leave the wave whose movement has been estimated.

17. The hull behavior control system according to claim 15, wherein the marine vessel includes a hull posture controller to control a posture of the hull;

the at least one controller is configured or programmed to control the hull posture controller; and when it is determined that the impact force equal to or greater than the threshold value will act on the hull after the hull travels over the wave whose movement has been estimated, control the hull posture controller to change the posture of the hull so as to reduce the impact force.

18. A marine vessel comprising:

a hull:

a posture controller; and the hull behavior control system according to claim 15.

* * * * *